United States Patent [19]

Tanaka et al.

[11] Patent Number: 4,910,667
[45] Date of Patent: Mar. 20, 1990

[54] VECTOR PROCESSOR WITH VECTOR BUFFER MEMORY FOR READ OR WRITE OF VECTOR DATA BETWEEN VECTOR STORAGE AND OPERATION UNIT

[75] Inventors: Teruo Tanaka, Kokubunji; Koichiro Omoda, Sagamihara; Yasuhiro Inagami, Kodaira; Takayuki Nakagawa, Kokubunji; Mamoru Sugie, Sayama; Shigeo Nagashima, Hachioji, all of Japan

[73] Assignee: Hitachi, Ltd., Tokyo, Japan

[21] Appl. No.: 184,788

[22] Filed: Apr. 22, 1988

Related U.S. Application Data

[63] Continuation of Ser. No. 828,520, Feb. 12, 1986, abandoned.

[30] Foreign Application Priority Data

Feb. 25, 1985 [JP] Japan .................................. 60-34353

[51] Int. Cl.⁴ ................... G06F 15/367; G06F 13/00; G06F 3/04
[52] U.S. Cl. .............................. 364/200; 364/232.21; 364/243.243.4; 364/243.41
[58] Field of Search ... 364/200 MS File, 900 MS File

[56] References Cited

U.S. PATENT DOCUMENTS

| 4,128,880 | 0/0000 | Cray | 364/200 |
|---|---|---|---|
| 4,166,289 | 8/1979 | Murtha et al. | 364/200 |
| 4,166,289 | 8/1979 | Murtha et al. | 364/200 |
| 4,435,765 | 3/1984 | Uchida et al. | 364/200 |
| 4,507,728 | 3/1985 | Sakamoto et al. | 364/200 |
| 4,507,728 | 3/1985 | Sakamoto et al. | 364/200 |
| 4,641,275 | 2/1987 | Hatakeyama et al. | 364/900 |
| 4,651,274 | 3/1987 | Omoda et al. | 364/200 |
| 4,780,810 | 10/1988 | Torii et al. | 364/200 |

Primary Examiner—Raulfe B. Zache
Assistant Examiner—Ayni Mohamed
Attorney, Agent, or Firm—Antonelli, Terry & Wands

[57] ABSTRACT

In a vector processor having vector registers, a vector buffer storage for temporarily storing vector data is arranged closer to the vector registers than to a main storage, and a vector buffer storage control including an identification storage for storing identification information of the vector data stored at storage locations of the buffer storage and a check circuit for checking if the vector data identification information is in the identificatgion storage is provided. The vector buffer storage control checks if the identification information of the vector data designated by a vector data fetch instruction for the main storage is in the indentification storage, and if it is in the identification storage, it fetches the vector data from the buffer storage and transfers it to the vector register, and if it is not in the identification storage, it instructs to fetch the vector data from the main storage, transfers the vector data fetched from the main storage to the vector register and stores it into the buffer storage.

12 Claims, 6 Drawing Sheets

VECTOR PROCESSOR WITH VECTOR BUFFER MEMORY FOR READ OR WRITE OF VECTOR DATA BETWEEN VECTOR STORAGE AND OPERATION UNIT

This is a continuation of application Ser. No. 828,520, filed Feb. 12, 1986, now abandoned.

BACKGROUND OF THE INVENTION

1. FIELD OF THE INVENTION

The present invention relates to a vector processor which can efficiently supply data from a main storage to a processor to efficiently perform a vector operation.

2. DESCRIPTION OF THE RELATED ART

As the development of computers in a data processing field advances, various vector computer systems have been developed to improve a processing capability for vector data. Examples of such systems are those disclosed in U.S. Pat. Nos. 4,172,287 and 4,128,880. In the computer system disclosed in U.S. Pat. No. 4,172,287, a data transfer capability from a main storage to an operation unit, which fits to a performance of the operation unit, is required. However, there is a limit in the data transfer capability. In U.S. Pat. No. 4,128,880, in order to reduce a burden to the data transfer from the main storage, vector registers which hold vector data transferred from the main storage or interium results of the vector operation are arranged closer to the operation unit than to the main storage. The vector registers are effective means to efficiently operate a pipeline operation unit which processes the vector data. When the number of vector data necessary in one run of vector processing is smaller than the number of vector registers, the operation can be performed among the vector registers once the vector data have been loaded to the vector registers from the main storage. Accordingly, the effect of the vector register is significant. However, when the number of vector data necessary in one run of vector processing is larger than the number of vector registers, the transfer of the vector data between the main storage and the vector registers is necessary in the course of the vector processing. This is a big factor to degrade the performance.

In a general purpose large scale computer system, a cache memory is used to reduce a burden of data transfer between the registers and the main storage. Since the cache memory is primarily designed for scalar data, reference keys therefor are addresses and a holding unit is a block containing necessary data (for example, 64 contiguous bytes). Accordingly, it is difficult to use the cache memory between the main storage and the vector registers because (1) each data has to be referenced by an address, and (2) when non-contiguous vector data are to be handled, the cache memory contains many unuseful data.

SUMMARY OF THE INVENTION

It is an object of the present invention to provide a vector processor which can reduce a burden of vector data request to a main storage.

In the vector processor of the present invention, when vector registers are provided in the processor, a vector buffer storage which temporarily retains the vector data is arranged closer to the vector registers than to the main storage, and a vector buffer storage control for controlling reading and writing of the vector buffer storage is provided. The vector buffer storage control includes an identification storage for storing identification information of the vector data stored in storage areas of the vector buffer storage and a check circuit for checking whether vector data identification information designated by a vector data read instruction supplied from the main storage has been stored in the identification storage. The vector data identification information may be a start address of the vector data on the main storage and its increment. In response to the vector data read instruction supplied from the main storage, the vector buffer storage control checks to see if the identification information for that vector data has been stored in the identification storage, and if it has been stored, it reads out the vector data from the vector buffer storage and supplies it to the vector register. If the identification information has not been stored, it requests fetching vector data from the main storage to load the vector data into the vector register from the main storage and store the vector data in the vector buffer storage.

In the past, the vector registers have been used to reduce the burden of fetching and transfer of the vector data from the main storage in the vector processor. By arranging the vector buffer storage between the main storage and the vector registers, the burden of fetching and transfer of the vector data from the main storage is further reduced.

The cache memory has been used in the past to reduce the burden of data transfer between the main storage and the registers, but since the cache memory stores the data of contiguous areas, there are problems in accessing the data and effective utilization of the memory area. In the present invention, the vector data stored in the vector buffer storage can be read out by using, for example, the identification information such as the start address on the main storage and the increment therefor so that individual vector data can be read out. When non-contiguous data are to be handled, only necessary data may be stored in the vector buffer storage and the storage area of the memory storage can be effectively utilized.

Where the vector registers are not provided in the vector processor, the vector buffer storage is arranged between the main storage and an operation unit. In this case, also, the burden of fetching and transfer of vector data from the main storage can be reduced and similar advantages as those described above are attained in accessing the vector data.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
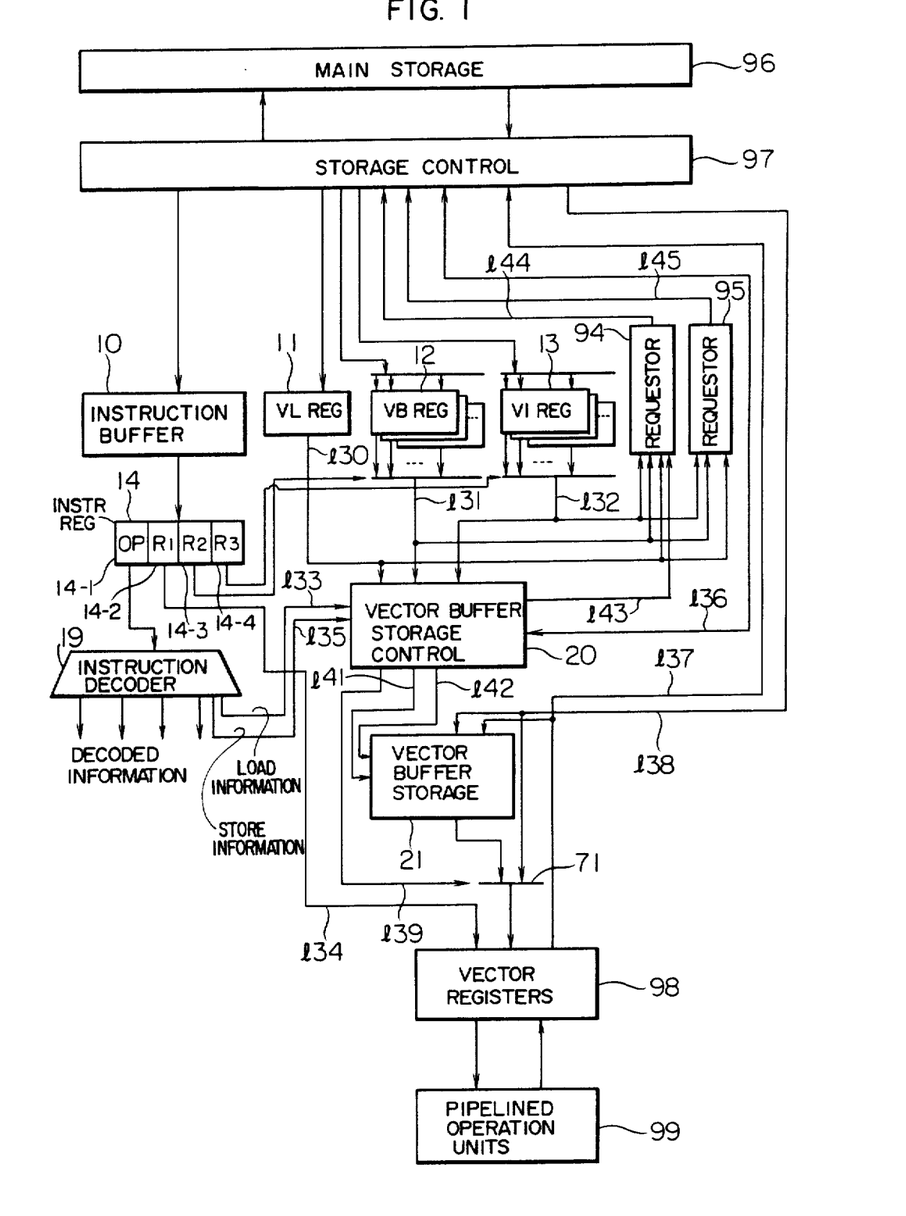
FIG. 1 shows an overall configuration of one embodiment of a vector processor which uses vector registers, and particularly shows an instruction control mechanism, a vector buffer storage and a control mechanism therefor.

FIG. 1 shows one embodiment of the vector processor. Numeral 10 denotes an instruction buffer, numeral 11 denotes a vector length register (VLR) which holds a vector length, numeral 12 denotes a group of vector base registers (VBR) which specify start addresses of vector data on a main storage, numeral 13 denotes a group of vector increment registers (VIR) which hold increments of the vector data on the main storage, numeral 14 denotes a vector instruction register, numeral 19 denotes an instruction decoder, numeral 20 denotes a vector buffer storage control, numeral 21 denotes a vector buffer storage, numeral 94 denotes a fetch requester, numeral 95 denotes a store requester, numeral 96 denotes the main storage, numeral 97 denotes a storage control, numeral 98 denotes vector registers, and numeral 99 denotes pipelined operation units. The vector buffer storage control 20 and the vector buffer storage 21 are functions which are newly added in the present invention.

Figure 6:
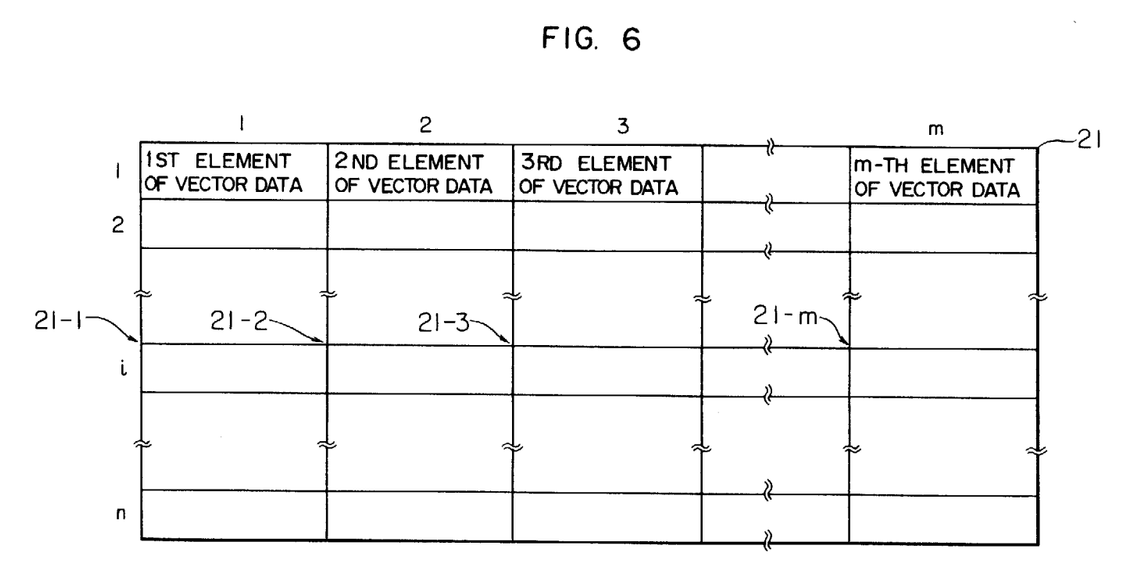
FIG. 6 shows a construction of a vector buffer storage.

FIG. 6 shows an embodiment of the vector buffer storage 21. It can hold up to n vector data. Each vector data consists of up to m elements. In order to access the vector data in the vector buffer storage 21, the vector buffer storage control 20 sends an address and a read signal or write signal through a line 141 or 142.

For example, when vector data having a vector length m in the i-th entry (elements of which are addressed by 21-1 to 21-m) is to be read, the read signal and the address 21-1 are sent through the line 141 as the address of the first element of the desired vector data. When the element at 21-1 has been read, the read signal and the address 21-2 are sent through the line 141 at the next timing as the address of the second element of the vector data. The above operation is repeated so that the m-th element of the m-element vector data is finally read out.

The instructions fetched from the main storage 96 through the storage control 97 are stored in the instruction buffer 10 and sent to the instruction register 14 one instruction at a time. The instructions to be executed in the vector processing unit include a transfer instruction of vector data between the vector register 98 and the main storage 96 (load vector instruction, store vector instruction, etc.) and a vector operation instruction for effecting an operation on data between the vector registers. If the instruction decoder 19 decodes indicates that the instruction in the instruction register 14 is the vector operation instruction, a vector register in the group of vector registers 98 designated by the instruction and an operation unit in the pipelined operation units 99 designated by the instruction are enabled to carry out the operation designated by the instruction. The processing by the vector operation instruction is the same as that in the conventional vector processor. In the present invention, new processing is carried out when the load vector instruction or store vector instruction is executed.

The execution of the load vector instruction will be first described. The instruction loaded into the instruction register 14 has a format shown by 14-1 to 14-4. An OP field 14-1 contains an operation code which the instruction decoder 19 decodes to be the load vector instruction. A field R1 14-2 contains a vector register number to which the vector data is to be loaded. It is sent to the vector register through a line 134. A field R2 14-3 contain a vector base register (VBR) number which indicates the start address of the vector data in the main storage. The desired register VBR is selected from the group of registers (VBR) 12. A field R3 14-4 contains a vector increment register (VIR) number which indicates the increment for the vector data in the main storage. The desired register VIR is selected from the group of registers (VIR) 13 by using the increment. The vector length register VLR holds the length of the vector data (number of elements in the vector data). Necessary information is sent from the main storage 96 to the register (VLR) 11, the group of registers (VBR) 12 and the group of registers (VIR) 13 before the load vector instruction is decoded by the instruction decoder 19. When the load vector instruction is decoded by the instruction decoder 19, a start signal generated thereby is sent to the vector buffer storage control 20 which is the newly added mechanism in the present invention through a line 133 to start it. The vector length signal is also sent from the register VLR 11 to the vector buffer storage control 20, the fetch requestor 94 and the store requestor 95 through a line 130. The content of the vector base register VBR selected from the group of registers 12 by the field R2 14-3 is sent to the vector buffer storage control 20, the fetch requestor 94 and the store requestor 95 through a line 131. It indicates the start address of the vector data in the main storage. The content of the vector increment register VIR selected from the group of registers 13 by the field R3 14-4 is sent to the vector buffer storage control 20, the fetch requestor 94 and the store requestor 95 through a line 132. It indicates the increment for the vector data. The start address and the increment are keys to check whether the necessary vector data is stored in the vector buffer storage 21. In the present identification embodiment, the start address and the increment are used as the information to identify the vector data. It is possible to use other data as the identification information.

If the vector buffer storage control 20 determines that the desired vector data is in the vector buffer storage 21, it sends the address of the vector data and a read signal to the vector buffer storage 21 through a line 141, and sends a select signal through a line 139 so that the vector data is transferred from the vector buffer storage 21 to the vector registers 98 through the selector 71.

If the vector buffer storage control 20 determines that the desired vector data is not in the vector buffer storage 21, it activates the fetch requestor 94 through a line 143 to send the vector data to the vector registers 98 from the main storage 96 through the storage control 97, a line 138 and the selector 71. The address of the vector data and a write signal are sent from the vector buffer storage control 20 through a line 142, and the vector data is written into the vector buffer storage 21 through a line 138.

Figure 2:
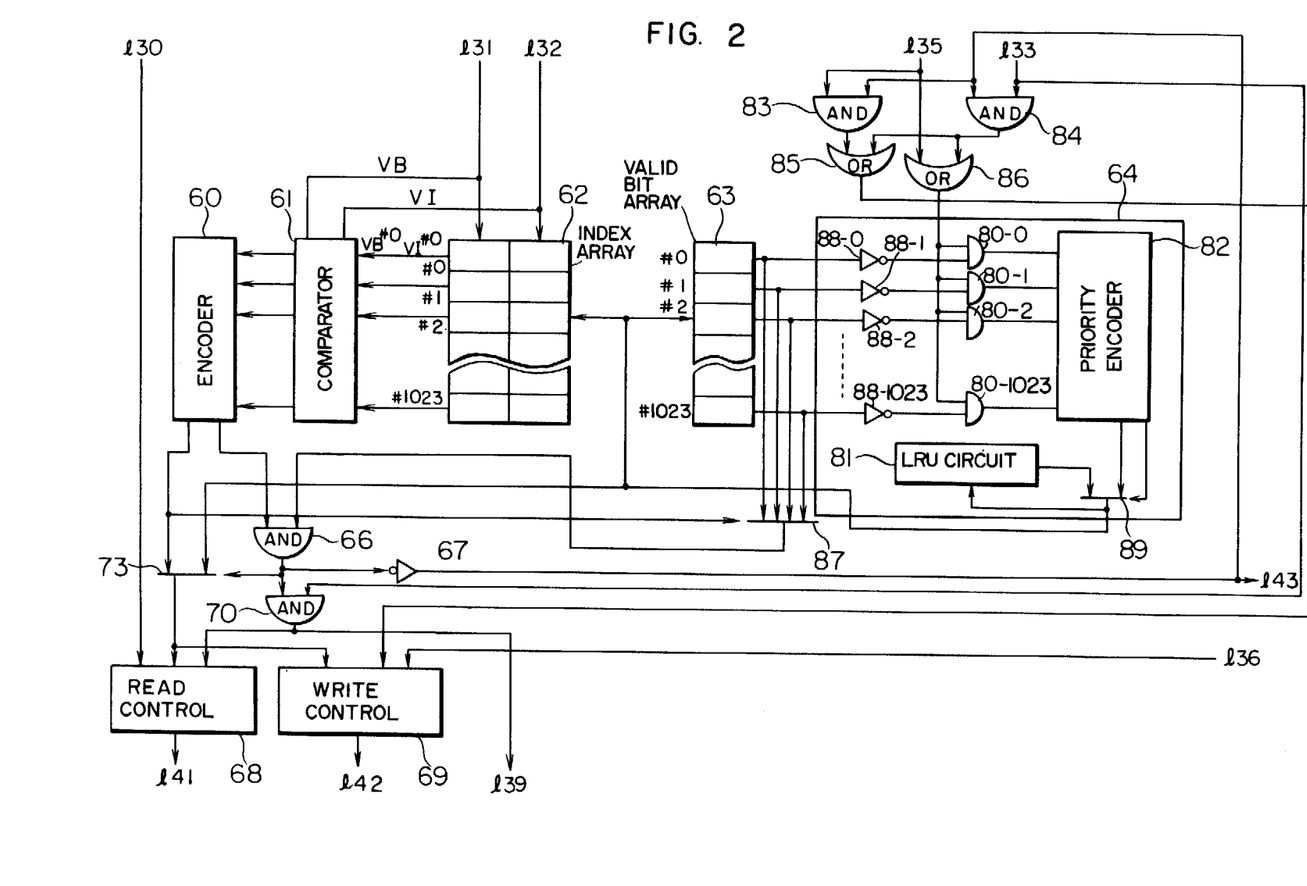
FIG. 2 shows a detail of the vector buffer storage control in FIG. 1.

Referring to FIG. 2, a detail of the operation of the vector buffer storage control 20 is explained.

FIG. 2 shows a detail of the vector buffer storage control 20 which is the newly added mechanism of the present invention. Numeral 60 denotes an encoder, numeral 61 denotes a comparator, numeral 62 denotes an index array which forms an identification storage, numeral 63 denotes a valid bit array, numeral 68 denotes a read control, numeral 69 denotes a write control, numeral 64 denotes a registration circuit, numerals 83, 84 and 70 denote AND circuits, numerals 85 and 86 denote OR circuits and numeral 67 denotes a NOT circuit. The registration circuit 64 comprises a priority encoder 82, an LRU (least recently used) circuit 81, AND circuits 80-0 to 80-1023, NOT circuits 88-0 to 88-1023 and a selector 89. The operation of the mechanism is different depending on whether the desired vector data is in the vector buffer storage 21 or not. This is now explained in detail.

A common operation is first explained. As the load vector instruction is decoded, a signal is sent to the AND circuits 84 and 70 through the line 133. Thus, the AND circuits 84 and 70 wait for a start instruction from the AND circuit 66 or a NOT circuit 67. The start address of the vector data and the increment therefor are sent to the comparator 61 through the lines 131 and 132, respectively, and they are compared with the pairs of a start address and an increment stored as identification data in the index array 62. The compare results are sent to the encoder 60. If they coincide with one of the pairs of a start address and an increment, an equal signal is sent from the encoder 60 to the AND circuit 66. The index array number at which the equality is detected is sent from the encoder 60 to the selectors 73 and 87. The selector 87 selects a valid bit corresponding to the number sent from the comparator 61, from the valid bit array 63 and sends it to the AND circuit 66. The AND circuit 66 receives the equal signal and the valid bit signal. If both are applied to the AND circuit 66, the AND circuit 70 sends a start signal to the read control 68. If either one is not applied to the AND circuit 66, it activates the registration circuit 64 through the AND circuit 84 and the OR circuit 86.

The operation when the registration circuit 64 has been activated and the operation when the read control 68 has been activated by the AND circuit 70 are now explained.

The operation when the registration circuit 64 has been activated is first explained. The registration circuit 64 is shown in FIG. 2. When it receives a signal from the OR circuit 86, it fetches the valid bits in the valid bit array 63 through the NOT circuits 88-i and the AND circuits 80-i and sends them to the priority encoder 82. The priority encoder 82 detects one of the bits for representing valid from bits which represent invalid. If no invalid bit is found, that is, all bits in the index array are valid, one bit is selected by using a known algorithm such as the LRU circuit 81. The selected bit position is indicated to the selector 73 and the index array 62. It is also indicated to the valid bit array 63 to validate that bit position. The start address and the increment sent through the lines 131 and 132 are set at the designated position of the index array 62. The data which has been sent to the selector 73 is sent to the write control 69 as an entry number of the vector buffer storage 21. The NOT circuit 67 sends a start signal to fetch the data from the main storage, to the fetch requester 94 through the line 143. The vector length signal, start address and increment are sent to the fetch requestor 94 through the lines 130, 131 and 132. The AND circuit 84 sends a start signal to the write control 69 through the OR circuit 85. The data send signal is sent to the write control 69 from the main storage through the line 136. It is used to increment the address sent from the write control 69 to the vector buffer storage 21. The vector data is read from the main storage and written into the vector buffer storage 21 through the line 138. It is also loaded into the vector register through the selector 71.

The operation when the start signal has been sent from the AND circuit 70 to the read control 68 is now explained. The selected bit position in the index array 62 is sent to the read control 68 through the selector 73. The vector length signal is sent to the read control 68 through the line 130. The start signal is sent from the AND circuit 70. The address and the read signal are sent from the read control 68 to the vector buffer storage 21 and the vector data is read out. The read control 68 includes a counter which updates the address to be sent to the vector buffer storage 21 together with the read signal. The elements of the vector data are read from the vector buffer storage 21 one element at a time and sent to the selector 71 (shown in FIG. 1) and the vector registers 98.

The selector 71 is controlled by the select signal supplied from the AND circuit 10 through the line 139. The destination vector register number is sent through the line 134.

The execution of the store vector instruction is now described. In FIG. 1, if the instruction decoder 19 decodes the instruction sent from the instruction register 14 as the store vector instruction, it activates the vector buffer storage control 20 through the line 135. The registers VBR and VIR which indicate the position on the main storage at which the vector data is to be stored are selected and the contents thereof are sent to the vector buffer storage control 20 through the lines 131 and 132, respectively. Referring to FIG. 2, the start address and the increment sent through the lines 131 and 132 are sent to the comparator 61 which compares them with the index array 62. If equal one is detected, the position thereof is indicated to the registration circuit 64 and the write control 69 is activated to write it into the corresponding position in the vector buffer storage 21 (and also store the vector data in the main storage). It should be noted that the vector data stored at the same position in the vector buffer storage 21 is erased. If equal one is not detected, a position in the valid bit address 63 at which the vector data has not yet been registered on the vector buffer storage 21 is located and the vector data is witten into that position (and stored in the main storage).

The start address and the increment are registered at the corresponding position in the index array 62, and the corresponding position in the valid bit array 63 is validated.

The vector data is written into both the main storage and the vector buffer storage 21 in response to the store vector instruction, as described above. Alternatively, the vector data may be temporarily written into only the vector buffer storage but not written into the main storage.

It may be possible to reduce the burden of vector data request to the main storage by increasing the number of vector registers without using the vector buffer storage 21 of the present invention. In this case, however, two problems are involved. First, even if the number of vector registers is increased, the effect of the increase in the number of vector registers is not expected if the load modules or compilers before the increase of the vector registers are used. When the vector buffer storage is used, the effect of the use of the vector buffer storage 21 is attained without modifying the load modules or compilers. Secondly, in the vector processor in which the vector register number is designated by the operand of the vector instruction, the instruction format has to be altered in some cases. In the instruction format of the presently available vector processor, only 16~64 registers at maximum can be designated by the instruction field. If more registers are to be designated, the instruction format must be expanded. Whereas, when the vector buffer storage is introduced, there is no need to alter the instruction format.

A second embodiment is now explained. In the first embodiment, the application to the vector processor having the vector registers such as the processor disclosed in U.S. Pat. No. 4,128,880 was described. In the second embodiment, an application to a vector processor having no vector register as disclosed, for example, in U.S. Pat. No. 4,171,287 is described.

Figure 3:
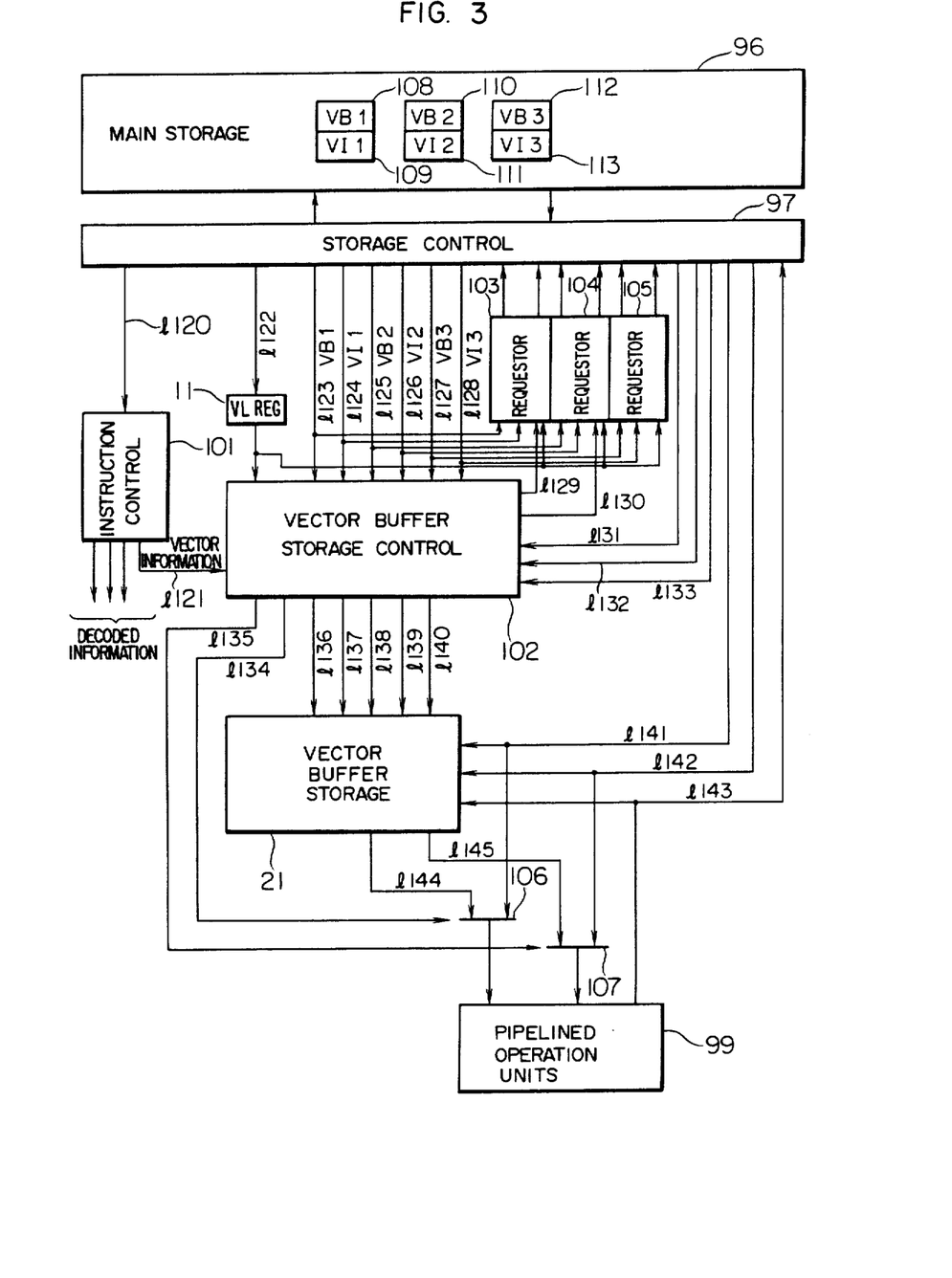
FIG. 3 shows an overall configuration of an embodiment of a vector processor which does not use a vector register.

FIG. 3 shows an embodiment of the vector processor which does not use the vector register. Numeral 21 denotes a vector buffer storage, numeral 11 denotes a vector length register (VLR) which holds a vector length, numeral 96 denotes a main storage, numeral 97 denotes a storage control, and numeral 99 denotes pipelined operation units. Those elements are identical to those shown in FIG. 1. Numeral 101 denotes an instruction control, numerals 103 and 104 denote fetch requestors, numeral 105 denotes a store requester, numeral 102 denotes a vector buffer storage control and numeral 106 and 107 denote selectors.

The instruction sent from the main storage 96 through the storage control 97 is supplied to the instruction control 101 through a line 1120 and is decoded thereby. If the decoded instruction is a vector instruction, it is sent to the vector buffer storage control 102 through a line 1121 to activate it. In the vector processor having no vector register, as disclosed for example, in U.S. Pat. No. 4,172,287, the vector instruction is of the SS (storage to storage) type, in which one instruction designates two vector data on the main storage 96, instructs that a vector operation is carried out with the two vector data, and designates a location on the main storage 96 at which the result is to be stored. The location of the vector data on the main storage 96 is designated by 108 and 113. The address of the two vector data to be read are designated by VB1 108, VI1 109, VB2 110 and VI2 111, where VB represents a start address of the vector data and VI represents an increment for the vector data. The address on the main storage of the vector data to be stored is designated by VB3 112 and VI3 113. The VB1 and VI1 are sent to the vector buffer storage control 102 and the fetch requestor 103. The VB2 and VI2 are sent to the vector buffer storage control 102 and the fetch requestor 104. The VB3 and VI3 are sent to the vector buffer storage control 103 and the store requestor 105.

The vector buffer storage control 102 uses the VB1 and VI1 as keys to check whether the desired vector data is in the vector buffer storage 21. If the desired vector data is in the vector buffer storage 21, the address of the vector data and a read signal are sent to the vector buffer storage 21 through a line 1136. A select signal is sent through a line 1134 and the vector data is sent to the pipelined operation unit 99 from the vector buffer storage 21 through the selector 106. If the desired vector data is not in the vector buffer storage 21, the fetch requestor 103 is activated through a line 1129 and the vector data is sent to the pipelined operation units 99 from the main storage 96 through a line 1141. The vector data is also sent to the vector buffer storage 21 through the line 1141 and registered therein in accordance with the address and write destination signal sent through a line 1137. Another vector data is checked by the VB2 and VI2.

The two vector data are operated on in the pipelined operation units 99 and the operation result is sent to the main storage 96 through a line 1143. The store address on the main storage is obtained by reading the VB3 112 and the VIR 113 through lines 1127 and 1128 and is checked by the store requestor 105. The result vector data is also stored in the vector buffer storage 21 through a line 1143. The storage location is determined by the vector buffer storage control 102 based on the VB3 and VI3 sent through the lines 1127 and 1128, and the write signal and the address are sent to the vector buffer storage 21 through a line 1140.

Figure 4:
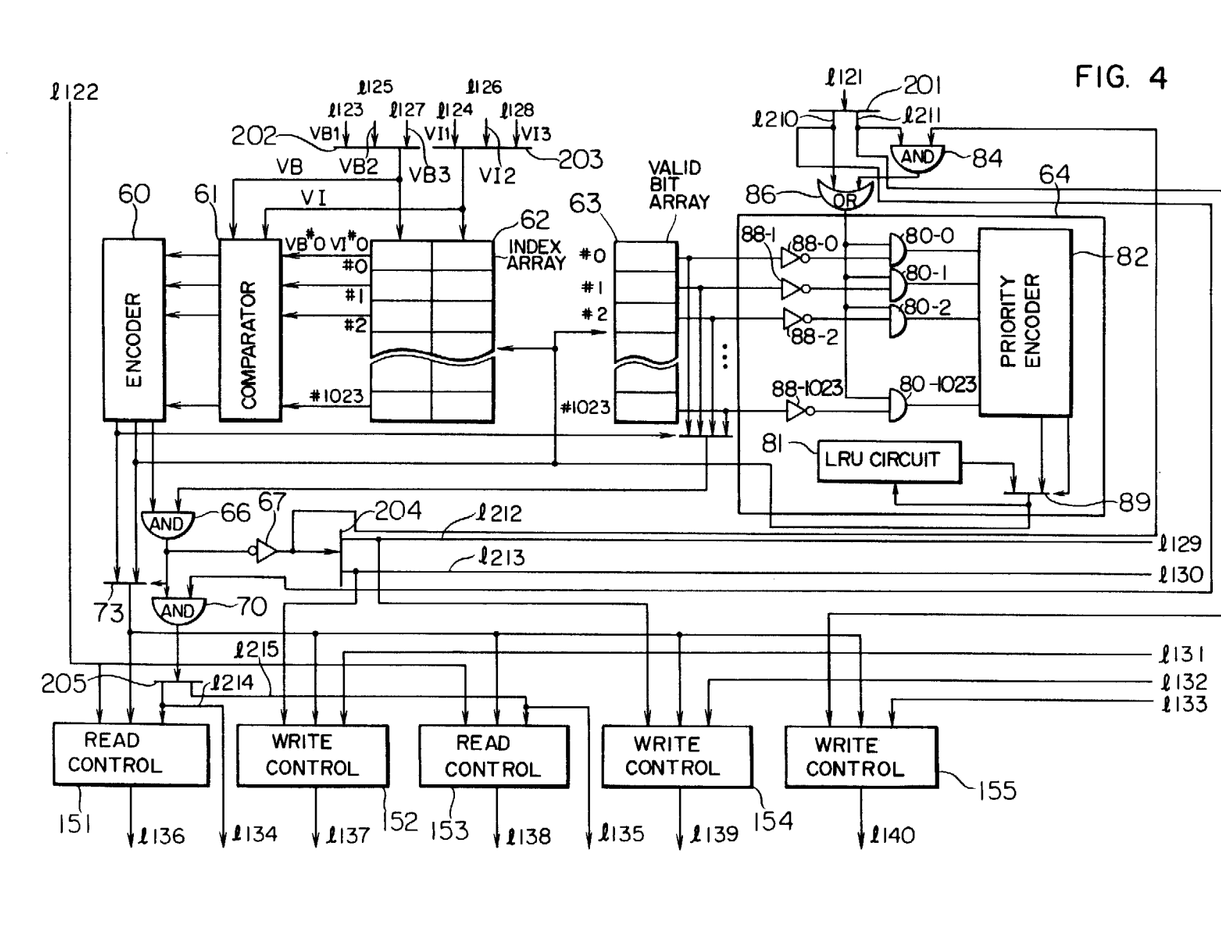
FIG. 4 shows a detail of the vector buffer storage control in FIG. 3.

FIG. 4 shows a detail of the vector buffer storage control 102. It has the same function as the vector buffer storage control of FIG. 2 in which the vector registers are used, except for signal lines 1121~1140 and selectors 201~205 which are newly added in FIG. 4.

In the second embodiment, the vector buffer storage control 102 must simultaneously check three vector data. Since only one comparator is provided in the present embodiment, the three processings must be serially executed. The selectors 201 to 205 are provided for this purpose.

As the vector buffer storage control 102 is activated through the line 1121, the selector 201 selects the line 1210, the selector 202 selects the line 123, the selector 203 selects the line 1124, the selector 204 selects the line 1212 and the selector 205 selects the line 1214 to check if the vector data designated by the VB1 and VI1 is in the vector buffer storage 21. If it is in the vector buffer storage 21, the read control 151 is activated through the AND circuits 66 and 70 and the selector 205. The position of the vector data on in the vector buffer storage is sent from the encoder 60 to the read control 151. Based on this information, the read control 151 sends the address of the vector data and the read signal to the vector buffer storage 21 through the line 1136.

If the designated vector data is not in the vector buffer storage 21, the write control 152 is activated through the AND circuit 66 and the selector 204. The information on the position at which the vector data is to be registered is sent from the registration circuit 64 to the write control 152. Based on that information, the write control 152 sends the address of the vector data and the write signal to the vector buffer storage 21 through the line 1137.

Then, the selector 201 selects the line 1210, the selector 202 selects the line 1125, the selector 203 selects the line 1126, the selector 204 selects the line 1213 and the selector 205 selects the line 1215 to check whether the vector data designated by the VB2 and VI2 is in the vector buffer storage 21.

If it is in the vector buffer storage 21, the read control 153 is activated through the AND circuits 66 and 70 and the selector 205. The location of the vector data in the vector buffer storage 21 is sent to the read control 153 from the encoder 60. Based on those information, the read control 153 sends the address of the vector data and the read signal to the vector buffer storage 21 through the line 1136.

If the designated vector data is not in the vector buffer storage 21, the write control 154 is activated through the AND circuit 66 and the selector 204. The information on the location at which the vector data is to be registered is sent to the write control 154 from the registration circuit 64. Based on those information, the write control 154 sends the address of the vector data and the write signal to the vector buffer storage 21 through the line 1137.

Finally, the selector 201 selects the line 1211, the selector 202 selects the line 1127 and the selector 203 selects the line 1128 to store the vector data designated by the VB3 and VI3 in the main storage and determine the location on the vector buffer storage 21 at which the vector data stored in the main storage is held. The determined location is sent to the write control 155. The write control 155 is activated through the line 1121 and the selector 201. Based on this information, the write control 155 sends the address of the vector data and the write signal to the vector buffer storage 21 through the line 1140.

Since three vector data are concurrently read and written from and to the vector buffer storage, two read controls and three write controls are provided.

The above operations are carried out by one vector instruction so that the function of the vector buffer storage without a vector register is attained.

The construction of the vector buffer storage 21 is essentially same as that of the first embodiment. It is constructed as shown in FIG. 6. The vector buffer storage 21 is usually constructed by a memory. Since one-input, two-output processing or three-input processing is carried out, a multi-bank configuration is required to allow such processing.

A third embodiment is now explained. In the present embodiment, the vector buffer storage is applied to a parallel processor. The pipelined operation system has been used to carry out the vector processing at a high speed (for example, in the first embodiment). In order to further enhance the performance of the computer, a parallel processing system has been proposed in which the vector data to be processed is divided into several groups, which are processed in parallel. In the parallel processing system, the vector data is divided into as many groups as the number of parallelly arranged operation units (which are pipelined operation units by themselves) and the groups are parallelly processed by the pipelined operation units. In this case, however, the data throughput between the main storage and the operation units must be increased in proportion to the degree of parallelism. It is difficult to increase the data throughput in proportion to the number of operation units. Thus, the vector buffer storage is applied to the parallel processor as shown in the embodiment of FIG. 5.

Figure 5:
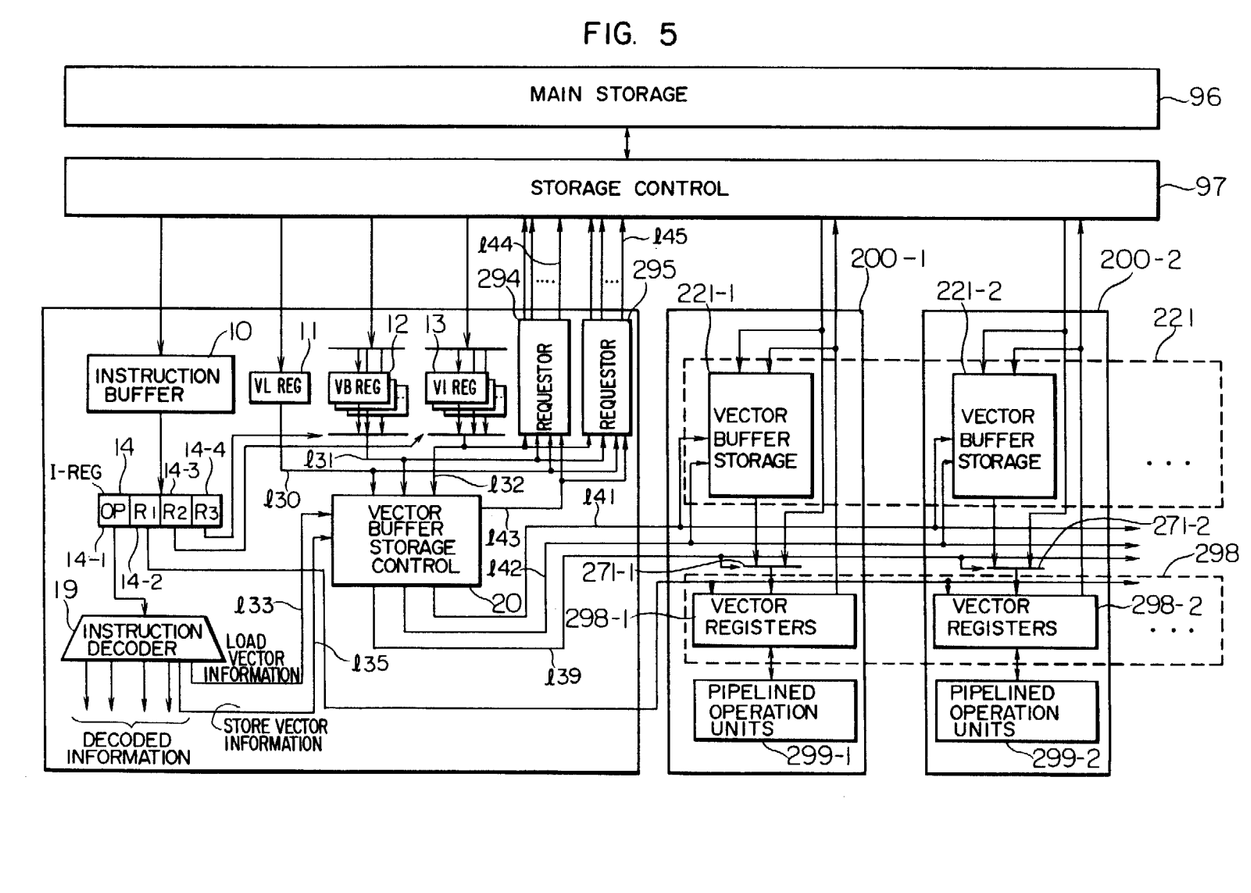
FIG. 5 shows an overall configuration of an embodiment of a vector processor of a parallel processor type.

In FIG. 5, numeral 10 denotes an instruction buffer, numeral 11 denotes a vector length register (VLR) which holds a vector length, numeral 12 denotes a group of vector base registers (VBR) which hold start addresses of the vector data on the main storage, numeral 13 denotes a group of vector increment registers (VIR) which hold increments of the vector data in the main storage, numeral 14 denotes a vector instruction register, numeral 19 denotes an instruction decoder, numeral 20 denotes a vector buffer storage control, numeral 96 denotes the main storage and numeral 97 denotes a storage control. Those elements are essentially identical to those shown in FIG. 1. Numerals 200-1, 200-2, ... denote parallelly executable processor elements, and numerals 298-1, 298-2, ... denote vector registers which are divisions of a vector register 298 and which each hold partial vector data of the vector data divided by the number of processor elements.

More specifically, assuming that the number of vector elements held by each of the vector registers 98 is 256 and the number of processor elements is 64, a vector register in each processor element holds the partial vector data for eight elements. Thus, one of the vector registers 298-1 in the processor element #1 holds the data element numbers 1, 65, 129, ..., 193, one of the vector registers 28-2 in the processor element #2 holds the data element numbers 2, 66, 130, ..., 194, and so on. Numerals 299-1, 299-2, ... denote pipelined operation units, and numeral 221-1, 221-2, ... denote partial vector buffer storage which are divisions of the vector buffer storage 221 divided by the number of the processor elements #1 and #2 to hold part of the vector data.

Specifically, the column of the first element, the column of the 65th element, ..., the column of the 193rd element of the vector buffer storage 21 shown in FIG. 6 are formed on the processor element #1, and the column of the second element, the column of the 66th element, ..., the column of the 194th element are formed on the processor element #2, and so on. In this manner, the vector buffer storage 21 is divided into and held on the 256 processor elements. Numeral 294 denotes a fetch requestor which can simultaneously issue as many requests as the number of processor elements, and numeral 295 denotes a store requestor which can issue as many requests as the number of processor elements.

The operations of the instruction buffer 10, VLR 11, VBR 12, VIR 13, instruction decoder 19 and vector buffer storage control 20 are identical to those of the first embodiment explained in FIGS. 1 and 2. Only the differences from the first embodiment are explained here.

As a load vector instruction is executed and the vector buffer storage control 20 determines that the desired vector data is in the vector buffer storages 221-1, 221-2, ..., a read signal and the address are sent to the vector buffer storages 221-1, 221-2, ... in the processor elements 200-1, 200-2, ... from the vector buffer storage control 20 through a line 141. The processor elements 200-1, 200-2, ... send the vector data from the vector buffer storage 221-1, 221-2, ... to the parts designated by the field R1 14-1 of the vector registers 298-1, 298-2, ... through the selector 271-1, 271-2, ....

As the load vector instruction is executed and the vector buffer storage control 20 determines that the desired vector data is not included in the vector buffer storages 221-1, 221-2, ..., a start signal is sent from the vector buffer storage control 20 through a line 143 to activate the fetch requestor 294. The fetch requester 294 parallelly sends as many request signals as the number of processor elements 200-1, 200-2, ... to the main storage 96, and data is parallelly sent from the main storage 96 to one vector register designated by the field R1 14-1 within each group of vector registers 298-1, 298-2, ... of the processor elements. A write signal and the address are sent from the vector buffer storage control 20 to the vector buffer storages 221-1, 221-2, ... through the line 142, and the data sent from the main storage 96 is divided and written into the vector buffer storages 221-1, 221-2, ..., which correspond to the vector registers.

When the vector store instruction is executed, as many store-to addresses on the main storage 96 as the number of processing elements are parallelly sent to the main storage 96 from the store requestor 295 through the line 145 and the vector data is transferred from the vector registers to the main storage 96 for each processor element. The vector buffer storage control 20 designates the locations on the vector buffer storages 221-1, 221-2, . . . at which the vector data is to be stored so that the vector data to be stored in the main storage from the vector registers is held in the vector buffer storages 221-1, 221-2, . . . . Alternatively, the vector data may not be sent to the main storage and temporarily stored only in the buffer storages.

In this manner, some of the data transfer processings between the vector registers and the main storage 96 are closed in the vector registers 298-1, 298-2, . . . and the vector buffer storages 221-1, 221-2, . . . and in the processor elements 200-1, 200-2, . . . so that a portion of the data requests to the main storage 96 can be saved.

Thus, the vector buffer storages 221-1, 221-2, . . . which hold the vector data are distributedly arranged by the width of the processor element to correspond to the vector registers 298-1, 298-2, . . . while only one vector buffer storage control is required together with the other control system.

While particular embodiments of the invention have been shown and described, it will be obvious to those skilled in the art that various changes and modifications may be made without departing from the present invention in its broder aspect.

We claim:

1. A vector buffer storage for use in connection with a vector data storage which holds in addressable storage locations a number of vector data each comprised of a number of vector elements, comprising:
    buffer storage means for storing a copy of a portion of the plural vector data held in said vector data storage, each vector data being stored in said buffer storage means in a respective one of a plurality of data areas therein; and
    buffer storage control means connected to said buffer storage means for controlling a reading of vector data from or a writing of vector data into a particular data area of said buffer storage means in response to an applied read or write request respectively requesting a reading out of vector data from or a writing of applied vector data into said vector data storage and identification data which locates said particular data area, said buffer storage control means including:
    (a) identification data storage means for holding plural identification data each identifying a respective vector data held in one of said data areas of said buffer storage means;
    (b) detect means connected to said identification data storage means and responsive to applied identification data identifying the vector data to be read from said vector data storage or identifying the applied vector data to be written into said vector data storage for detecting whether or not identification data coincident with the applied identification data is already stored in said identification data storage means; and
    (c) read/write control means connected to said buffer storage means and said detect means and responsive to an applied read request for reading, as said requested vector data, one of plural vector data held by said buffer storage means when said detect means detects coincidence between the applied identification data and identification data for the one vector data, and responsive to an applied write request for writing the applied vector data into one data area of said data areas of said buffer storage means, when the detect means detects coincidence between the applied identification data and identification data for vector data already stored in said one data area.

2. A vector buffer storage according to claim 1, wherein said identification data for each vector data comprises a start address and an increment value, said start address being an address within said data storage of a starting vector element of each vector data and said increment value being an address difference between two adjacent vector elements of each vector data.

3. A vector buffer storage according to claim 1, wherein said control means includes:
    first means responsive to an applied read request and to detection by said detect means that there is no identification data for sending the applied read request to said vector data storage means so that the requested vector data is read out therefrom and for writing the read out vector data into one of said data areas of said buffer storage means, and responsive to an applied write request and to detection by said detect means that there is no coincident identification data for writing the applied vector data into one of said data areas of said buffer storage means; and
    second means connected to said first means for determining the one data area in which said read out vector data is to be written by said first means or the one data area in which the applied vector data is to be written by said first means.

4. A vector buffer storage according to claim 3, wherein said identification data for each vector data comprises a start address and an increment, said start address being an address within said data storage of a starting vector element of each vector data and said increment being address difference between two adjacent vector elements of each vector data.

5. A vector buffer storage according to claim 3, wherein said buffer storage means comprises storage means for sequentially reading or sequentially writing vector elements of each vector data.

6. A vector buffer storage according to claim 3, wherein said buffer storage means comprises storage means for parallelly reading or parallelly writing vector elements of each vector data.

7. A vector processor, comprising:
    vector data storage means for storing plural vector data;
    memory requester means connected to said vector data storage means for accessing said vector data storage means to read vector data from or to write vector data into said vector data storage means;
    a plurality of vector registers connected to said vector data storage means each for holding vector data;
    operation means connected to said plurality of vector registers for performing an operation on vector data read out from one of said vector registers and for providing one of said vector registers with vector data corresponding to a result of the operation;
    buffer storage means connected to said vector data storage means and said vector registers for holding plural vector data each in one of a plurality of data areas included in said vector buffer storage means;
    instruction means for decoding an applied instruction and for generating a read or write request and identification data identifying vector data which is requested by the applied instruction to be transferred between said vector data storage means and said vector registers; and buffer storage control means connected to said buffer storage means, said memory requester means, said instruction means and said vector registers for controlling the transfer of the requested vector data between said vector data storage means and said vector registers, said control means including:

(a) identification data storage means for holding plural identification data each identifying vector data held in one of said data areas of said buffer storage means;

(b) detect means connected to said instruction means and said identification data storage means and responsive to the generated identification data for detecting whether or not one of plural identification data already stored in said identification data storage means coincides with the generated identification data; and (c) read/write control means connected to said instruction means, said buffer storage means and said detect means and responsive to a generated read request for reading one of plural vector data from said buffer storage means to said vector registers when said detect means detects coincidence between the generated identification data and identification data for the one vector data, for sending the generated read request to said memory requester means so that said memory requester means reads the requested vector from said vector data storage means to said vector registers when said detect means does not detect said coincidence and for writing the requested vector data read out by said memory requester means into a selected one of said data areas, and responsive to the generated write request, for writing vector data read out from said vector registers into one of said data areas of said buffer storage means, when the detect means detects coincidence between the generated identification data and identification data for vector data already stored in said one data area and for writing the vector data read out from said vector registers into a selected one of the data areas of said buffer storage means when said detect means does not detect coincidence, said control means including means for selecting the one of said data areas in which the vector data read out of said vector storage means is to be written when said detect means does not detect coincidence or in which the vector data read out of said vector registers is to be written when said detect means does not detect coincidence.

8. A vector processor according to claim 7, wherein each data area of said buffer storage means is comprised of plural partial data areas each for holding part of vector elements of one vector data to be held by each data area, said plural partial data areas being accessible in parallel to each other for readout or write-in;

wherein each vector register is comprised of plural partial vector registers each for holding part of vector elements of one vector data to be held by each vector register, said partial vector registers operating in parallel to each other for read-out or write-in of vector data;

wherein said memory requester means includes means for parallelly reading or writing plural parts of vector data to be read from or to be written into said vector data storage means; and wherein said operation means includes a plurality of partial operation means connected to parallelly receive plural parts of vector data from said vector registers and to parallelly provide plural parts of vector data corresponding to a result of the operation by said plurality of partial operation means.

9. A vector processor according to claim 8, wherein each partial data area of said buffer storage means is capable of sequentially reading therein or writing therefrom plural vector elements of each part of vector data;

wherein each partial vector register includes means for sequentially reading therein or writing therefrom plural vector elements of each part of vector data;

wherein said memory requester means includes means for sequentially reading or writing plural vector elements of each part of vector data from or into said vector data storage means; and wherein said each partial operation means includes means for sequentially receiving plural vector elements of each vector data read out of said vector registers and for sequentially providing plural vector elements of each part of the vector data corresponding to the result of the operation thereby.

10. A vector processor, comprising:

vector data storage means for storing plural vector data;

memory requester means connected to said vector data storage means for accessing said vector data storage means respectively for read-out or for write-in of vector data;

operation means connected to said vector data storage means for performing an operation on input vector data and for providing vector data corresponding to a result of the operation on the input vector data;

buffer storage means connected to said vector storage means for holding plural vector data each in one of data areas included in said buffer storage means;

instruction means for decoding an applied instruction which requests reading of first vector data from said vector data storage means to said operation means and writing of second vector data provided by said operation means into said vector storage means and for generating a read request for the first vector data, a write request for the second vector data and first and second identification data respectively identifying said first and second vector data and buffer storage control means connected to said buffer storage means, said memory requester means, said instruction means and said operation means for controlling the reading of the first vector data and the writing of the second vector data, including:

(a) identification data storage means for holding plural identification data each identifying vector data held in one of said data areas of said buffer storage means;

(b) detect means connected to said instruction means and said identification data storage means and responsive to the first and second identification data for identifying whether or not one of plural identification data already held by said identification data storage means coincides with said first and second identification data; and (c) read/write control means connected to said instruction means, said detect means and said buffer storage means and responsive to the read request and to detection by said detect means of one identification data coincident with the first identification data for reading vector data corresponding to the one identification data from said buffer storage means to provide the read vector data to said operation means as said first vector data, responsive to the read request and to detection by said detect means of no coincident identification data for sending the read request to said memory requester means so that the first vector data is read out by said memory requester means from said vector data storage means to said operation means and for writing the read out vector data into a first selected one of said data areas of said buffer storage means, responsive to the write request and to detection by said detect means of one identification data coincident to the second identification data for writing the second vector data provided by said operation means into one of said data areas of said buffer storage means which holds vector data corresponding to the second identification data and responsive to the write request and to detection of no coincident identification data by said detect means for writing the second vector data into a second selected one of said data areas of said buffer storage means, said read/write control means including means for selecting the first and second data areas from said data areas of said buffer storage means.

11. A vector processor according to claim 10, wherein said identification data for each vector data comprises a start address and an increment value, said start address being an address within said data storage of a starting vector element of each vector data and said increment value being an address difference between two adjacent vector elements of each vector data.

12. A vector buffer storage for use in connection with a vector data storage which holds in address storage locations a number of vector data each comprised of a number of vector elements, comprising:

buffer storage means for storing a copy of a portion of the plural vector data held in said vector data storage, each vector data being stored in said buffer storage means in a respective one of a plurality of data areas therein; and buffer storage control means connected to said buffer storage means for controlling a reading of vector data from or a writing of vector data into said buffer storage means in response to an applied read or write request respectively requesting a reading out of vector data from or a writing of applied vector data into said vector data storage, said buffer storage control means including:

(a) identification data storage means for holding plural identification data each identifying a respective vector data held in one of said data areas of said buffer storage means;

(b) detect means connected to said identification data storage means and responsive to applied identification data identifying the vector data to be read from said vector data storage for detecting whether or not identification data coincident with the applied identification data is already stored in said identification data storage means; and (c) read/write control means connected to said buffer storage means and said detect means and responsive to an applied read request for reading, as said requested vector data, one of plural vector data held by said buffer storage means when said detect means detects coincidence between the applied identification data and identification data for the one vector data.

* * * * *